3,344,192
PROCESS FOR THE PREPARATION OF
β-IONONE
Klaas Kes, Bussum, Willem Berends, Naarden, and Harmannus Boelens, Bussum, Netherlands, assignors to N.V. Chemische Fabriek Naarden, Naarden, Netherlands
No Drawing. Filed Sept. 21, 1964, Ser. No. 398,044
Claims priority, application Netherlands, Oct. 8, 1963, 298,958
8 Claims. (Cl. 260—587)

The invention relates to a process for the preparation of β-ionone by cyclization of pseudo-ionone.

Pseudo-ionone is known to be cyclized under the influence of sulphuric acid to α-ionone and β-ionone. With 50 percent aqueous sulphuric acid the product obtained is mainly α-ionone; with concentrated sulphuric acid on the other hand it is almost exclusively β-ionone (E. E. Royals, Industrial Engineering Chemistry, 38 (1946), pp. 546–548).

It is a serious disadvantage that the use of concentrated sulphuric acid for the cyclization of pseudo-ionone to β-ionone entails oxidation and sulphonation as undesirable side-reactions. The yield of β-ionone is thus adversely affected.

Dilution of sulphuric acid with water eliminates these disadvantages, but favors the formation of α-ionone. If, however, a β-ionone of great purity is to become available, e.g. as starting material for the synthesis of vitamin A, this is undesirable, also because it is not a simple procedure to separate the two ionone isomers.

It is known that during the cyclization of pseudo-ionone under the influence of concentrated sulphuric acid, in the presence of a polar or only slightly polar solvents, it is mainly β-ionone that is formed. It is also known that dilution of the sulphuric acid with the polar solvent water, during the cyclization of pseudo-ionone, greatly favors the formation of α-ionone.

It might therefore be expected that during the said cyclization the dilution of sulphuric acid with a polar lower aliphatic alcohol would also favor the formation of α-ionone.

However, the surprising discovery was made that during the cyclization of pseudo-ionone with concentrated sulphuric acid in the presence of monohydric or dihydric lower aliphatic alcohols containing 1–3 carbon atoms, in particular methanol, excellent yields of β-ionone with a high content of desired product and practically free from α-ionone are obtained.

Other examples of suitable lower aliphatic alcohols are ethanol, propanol, isopropanol, and ethylene glycol.

The process according to the invention is preferably carried out with sulphuric acid having a concentration between 93 and 98% and at a temperature varying between −20° C. and +20° C. and preferably between −10° C. and 0° C. The proportion by weight pseudo-ionone:sulphuric acid is 1:1–6, preferably about 1:3.

The use of less polar or apolar diluents, such as diisopropyl ether and saturated aliphatic hydrocarbons, as diluents for sulphuric acid during the cyclization of pseudo-ionone already formed the subject-matter of several patents, in particular of British patent specification 833,088 for diisopropyl ether and of British patent specification 843,741 for saturated aliphatic hydrocarbons.

The use of the lower aliphatic alcohols has considerable advantages over that of these diluents. When diisopropyl ether or lower hydrocarbons are used, these solvents have to be removed by a fractional distillation, which involves a decrease of the yield of ionone, caused by thermal influences. The lower aliphatic alcohols on the other hand can be removed from the reaction mixture by simple washing with water. Methanol moreover has the additional advantages of being extremely inexpensive.

Furthermore the quantity of the lower aliphatic alcohol used in the present process is smaller than that of diisopropyl ether or lower hydrocarbons required in the other cases. Only 5–20% by weight and preferably 7½–10% by weight of lower aliphatic alcohol, calculated on the sulphuric acid, is used.

The heat of reaction liberated during the cyclization when methanol is used is considerably smaller than when diisopropyl ether or aliphatic hydrocarbons are used. Finally the use of diisopropyl ether is not without risks, because it is known (Industrial & Engineering Chemistry 53 (1961), No. 2, p, 63A) that diisopropyl ether may give rise to the formation of dangerous and undesirable organic peroxides.

*Example I*

The cyclizing reagent is prepared by adding 30 g. of methanol, with stirring, to 300 g. of sulphuric acid (98%), at 0° C. The reagent is brought to −10° C. by external cooling. With stirring, 100 g. of pseudo-ionone (95% according to ultraviolet spectroscopic analysis) is added in 60 minutes. The mixture obtained then has a temperature of −5° C. It is stirred for another 15 minutes at the same temperature.

The reaction mixture is subsequently poured out into 1 liter of ice-water. The organic layer is separated and washed successively with an aqueous salt solution, with a 10% aqueous soda solution, and once again with a salt solution until the reaction is neutral. After drying and fractionation at reduced pressure, 88 g. of ionone with $n_D^{20}$ 1.5202 and a β-ionone content of 95% (determined by ultraviolet spectroscopic analysis) is obtained.

*Example II*

With stirring, 22.5 g. of methanol is added to 300 g. of technical sulphuric acid (93%) at a temperature of 0° C. The reagent is brought to −10° C. by external cooling. With stirring, 100 g. of pseudo-ionone (95%) is added to the reagent in 60 minutes. The mixture obtained then has a temperature of −5° C. It is stirred for another 15 minutes at the same temperature.

The reaction mixture is subsequently poured out into 1 liter of ice-water. The organic layer is separated and washed until neutral with aqueous salt and soda solutions in the manner described in Example I. After drying and fractionation at reduced pressure, 87 g. of ionone with $n_D^{20}$ 1.5206 and a β-ionone content of 96% is obtained.

*Example III*

With stirring, 30 g. of ethanol is added to 300 g. of sulphuric acid (98%) at a tempreature of 0° C. The reagent is brought to −10° C. by external cooling. With stirring, 100 g. of pseudo-ionone (95%) is added to the reagent in 60 minutes. The mixture obtained then has a temperature of −5° C. It is stirred for another 15 minutes at this temperature, after which the reaction mixture is poured out into 1 liter of ice-water. The organic layer is separated and washed until neutral with aqueous salt and soda solutions. After drying and fractionation at reduced pressure, 85 g. of ionone with $n_D^{20}$ 1.5203 and a β-ionone content of 95.5% is obtained.

*Example IV*

With stirring, 30 g. of n-propanol is added to 300 g. of sulphuric acid (98%) at a temperature of 0° C. The reagent is brought to −10° C. by external cooling. With stirring, 100 g. of pseudo-ionone (95%) is added to the reagent in 60 minutes. The mixture obtained then has a temperature of −5° C. It is stirred for another 15 minutes at this temperature, after which the reaction mixture is poured out into 1 liter of ice-water. The organic layer is separated and washed until neutral with aqueous salt and soda solutions. After drying and fractionation at reduced pressure, 83 g. of ionone with $n_D^{20}$ 1.5198 and a β-ionone content of 95.0% is obtained.

*Example V*

With stirring, 30 g. of isopropanol is added to 300 g. of sulphuric acid (98%) at a temperature of 0° C. The reagent is brought to —10° C. by external cooling. With stirring, 100 g. of pseudo-ionone (95%) is added to the reagent in 60 minutes. The mixture obtained then has a temperature of —5° C. It is stirred for another 15 minutes at this temperature, after which the reaction mixture is poured out into 1 liter of ice-water. The organic layer is separated and washed until neutral with aqueous salt and soda solutions. After drying and fractionation at reduced pressure, 81 g. of ionone with $n_D^{20}$ 1.5207 and a β-ionone content of 98.0% is obtained.

*Example VI*

With stirring, 30 g. of ethylene glycol is added to 300 g. of sulphuric acid (98%) at a temperature of 0° C. The reagent is brought to —10° C. by external cooling. With stirring, 100 g. of pseudo-ionone (95%) is added to the reagent in 60 minutes. The mixture obtained then has a temperature of —5° C. It is stirred for another 15 minutes at this temperature, after which the reaction mixture is poured out into 1 liter of ice-water. The organic layer is separated and washed until neutral with aqueous salt and soda solutions. After drying and fractionation at reduced pressure, 84 g. of ionone with $n_D^{20}$ 1.5205 and a β-ionone content of 96.0% is obtained.

We claim:

1. In a process for the preparation of β-ionone by cyclization of pseudo-ionone with the aid of concentrated sulphuric acid; the improvement comprising conducting the cyclization in the presence of an unsubstituted aliphatic alcohol containing at most 3 carbon atoms and at most 2 hydroxy groups and at a temperature between —20° C. and +20° C.

2. A process according to claim 1, in which said lower aliphatic alcohol is a member selected from the class consisting of methanol, ethanol, propanol, isopropanol, and ethylene glycol.

3. A process according to claim 1, in which said sulphuric acid has a concentration between 93% and 98%.

4. A process according to claim 1, in which the cyclization is carried out at a temperature between —10° C. and 0° C.

5. A process according to claim 1, in which said aliphatic alcohol is present in an amount which is 5–20% by weight of the sulphuric acid.

6. A process according to claim 1, in which said aliphatic alcohol is present in an amount which is 7½–10% by weight of the sulphuric acid.

7. A process according to claim 1, in which the proportion by weight pseudo-ionone:sulphuric acid is 1:1–6.

8. A process according to claim 1, in which the proportion by weight pseudo-ionone:sulphuric acid is about 1:3.

References Cited

UNITED STATES PATENTS 3,117,982   1/1964   Barton _____ 260—587

FOREIGN PATENTS 1,355,944   2/1964   France.
1,137,008   9/1962   Germany.
814,226   6/1959   Great Britain.
833,088   4/1960   Great Britain.

OTHER REFERENCES

West et al., "Synthetic Perfumes," pp. 170–171 (1949).

LEON ZITVER, *Primary Examiner.*

M. JACOB, *Assistant Examiner.*